United States Patent

Schwab

Patent Number: 5,619,378
Date of Patent: Apr. 8, 1997

[54] FIELD GLASS WITH ADDITIONAL INFORMATION

[75] Inventor: Kurt Schwab, deceased, late of Mils, Austria, by Rosemarie Schwab, heir

[73] Assignee: D. Swarovski & Co., Wattens, Austria

[21] Appl. No.: 494,608

[22] Filed: Jun. 23, 1995

Related U.S. Application Data

[63] Continuation of Ser. No. 88,325, Jul. 7, 1993, abandoned.

[30] Foreign Application Priority Data

Jul. 8, 1992 [DE] Germany .................. 42 22 417.9

[51] Int. Cl.⁶ ............................................ G02B 27/14
[52] U.S. Cl. ................................... 359/638; 359/428
[58] Field of Search .................... 359/399, 424, 359/427, 428, 630, 407, 419

[56] References Cited

U.S. PATENT DOCUMENTS

| | | | |
|---|---|---|---|
| 1,149,668 | 8/1915 | Matte | 359/427 |
| 2,759,393 | 10/1952 | McLeod | 359/399 |
| 4,248,496 | 2/1981 | Akin, Jr. et al. | 350/10 |
| 4,400,065 | 8/1983 | Nagler | 359/399 |
| 5,463,495 | 10/1995 | Murg | 359/399 |

FOREIGN PATENT DOCUMENTS

| | | | |
|---|---|---|---|
| 2319914 | 2/1977 | France | G02B 23/04 |
| 3317350 | 10/1984 | Germany | G02B 23/10 |
| 40046318 | 3/1983 | Japan . | |
| 1603599 | 11/1981 | United Kingdom | G02B 23/10 |

Primary Examiner—Georgia Y. Epps
Assistant Examiner—Thomas Robbins
Attorney, Agent, or Firm—Fish & Richardson P.C.

[57] ABSTRACT

A field glass having means for alternatively observing additional information, an information carrier or an information deflecting means being disposed in the beam path, the information carrier or information deflecting means being disposed within the housing of the field glass and adapted to be brought into and out of the beam path between the objective and eyepiece.

2 Claims, 3 Drawing Sheets

FIELD GLASS WITH ADDITIONAL INFORMATION

This is a continuation of application Ser. No. 08/088,325, filed Jul. 7, 1993, now abandoned.

BACKGROUND OF THE INVENTION

The present invention relates to a field glass having means for alternative observation of additional information.

Field glasses are already known in which additional information, such as direction, is superimposed on the image plane. The disadvantage of these known embodiments is that part of the image plane is permanently used for the additional information so that the total image plane can never be utilized for observing the primary information. Such field glasses are described for example in British patent no. 1 603 599 and German utility model no. 83 01 958.

Field glasses are also known in which an LC (liquid crystal) information carrier takes up the whole image plane. However such devices have the disadvantage that they involve a considerable loss of light.

European patent no. 170 655 also describes a means for reflecting additional information into a field glass. The additional information is additionally superimposed on the beam path. The disadvantage here is the technically elaborate and voluminous construction.

SUMMARY OF THE INVENTION

The present invention is based on the problem of providing a field glass with which one can alternatively utilize the total image plane to observe the primary information, or visualize additional information.

The invention is based on the finding that this problem can be solved by alternatively bringing an information carrier or an information deflecting means into the beam path.

The object of the invention is a field glass having means for alternatively observing additional information, an information carrier or an information deflecting means being disposed in the beam path, which is characterized in that the information carrier or information deflecting means is disposed within the housing of the field glass and adapted to be brought into and out of the beam path between the objective and eyepiece.

The inventive field glass has the advantage that when the information carrier or information deflecting means is not brought in one obtains an optimally bright image covering the whole image plane. If desired, one can ask for additional information by bringing in the information carrier or information deflecting means.

Since the information carrier or information deflecting means for the additional information can be brought out of the image plane it is advantageous, on the other hand, that the additional information can cover the whole image plane when the information carrier or information deflecting means is brought in.

According to another preferred embodiment various additional information, e.g. direction, time, etc., can be asked for on an information carrier or by an information deflecting means.

According to a further preferred embodiment a plurality of information carriers or information deflecting means can be provided which can be brought into the image plane alternatively and with various information. This also has the advantage that various information can be superimposed simultaneously or successively at various places in the image plane, e.g. at the top, bottom or sides.

The term "field glass" refers here to monoculars and binoculars as well as to aiming telescopes and the like.

The additional information brought in can be all types of information, for example direction, time, distance, temperature, cross-lines, maps. The information can be transmitted mechanico-optically, for example like the display of a mechanical compass via a suitable exposure and optical system. On the other hand the information can be transmitted electronically, for example by an electronic compass or an electronic clock.

The information carrier may be either an LC (liquid crystal) or an LD (light-emitting diode) display. These displays have the advantage that they can be brought directly into the beam path. For the LD display additional lighting can be provided.

As information deflecting means one will primarily use prisms and mirrors, including semitransparent ones.

The information carrier or information deflecting means can be brought in so as to cover the whole image plane or only part of it.

It is possible to provide a plurality of information carriers or information deflecting means so they can be brought into the image plane.

The information carriers or information deflecting means can be brought in by swiveling, tilting or sliding. For example they can be swiveled in using a turning knob. They can be brought in mechanically or electrically. The information carrier or information deflecting means is in any case inserted into the image plane.

It is advantageous to make the additional information means replaceable.

The invention shall be explained in more detail in the following with reference to drawings showing exemplary embodiments.

BRIEF DESCRIPTION OF THE DRAWINGS

FIG. 2 shows a longitudinal section of one half of the field glass with the information carrier swiveled in, and FIG. 3 shows a longitudinal section of one half of the field glass with the information deflecting means brought in.

DESCRIPTION OF THE PREFERRED EMBODIMENTS

Figure 1:
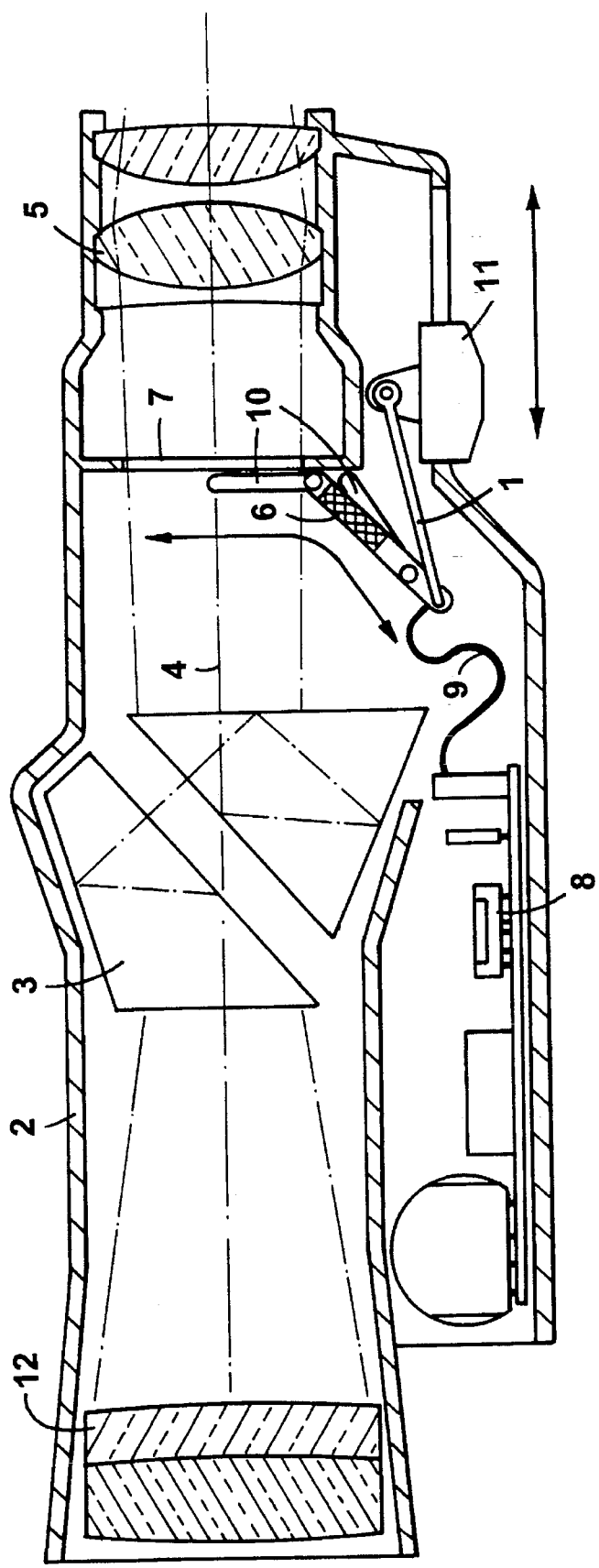
FIG. 1 shows a longitudinal section of one half of the field glass with the information carrier swiveled out.

The half of the field glass shown in FIG. 1 comprises housing 2, prisms 3, diaphragm 7, eyepiece 5 and objective 12. The beam path is referred to as 4.

Connecting means 9 lead from additional information means 8, which can work mechanically or electronically, to information carrier 6.

Control sliding knob 11 is used to move information carrier 6 via connecting rod 1 in guide means 10, i.e. to swivel it into and out of the beam path. In FIG. 1 information carrier 6 is shown in the swiveled out state.

Figure 2:
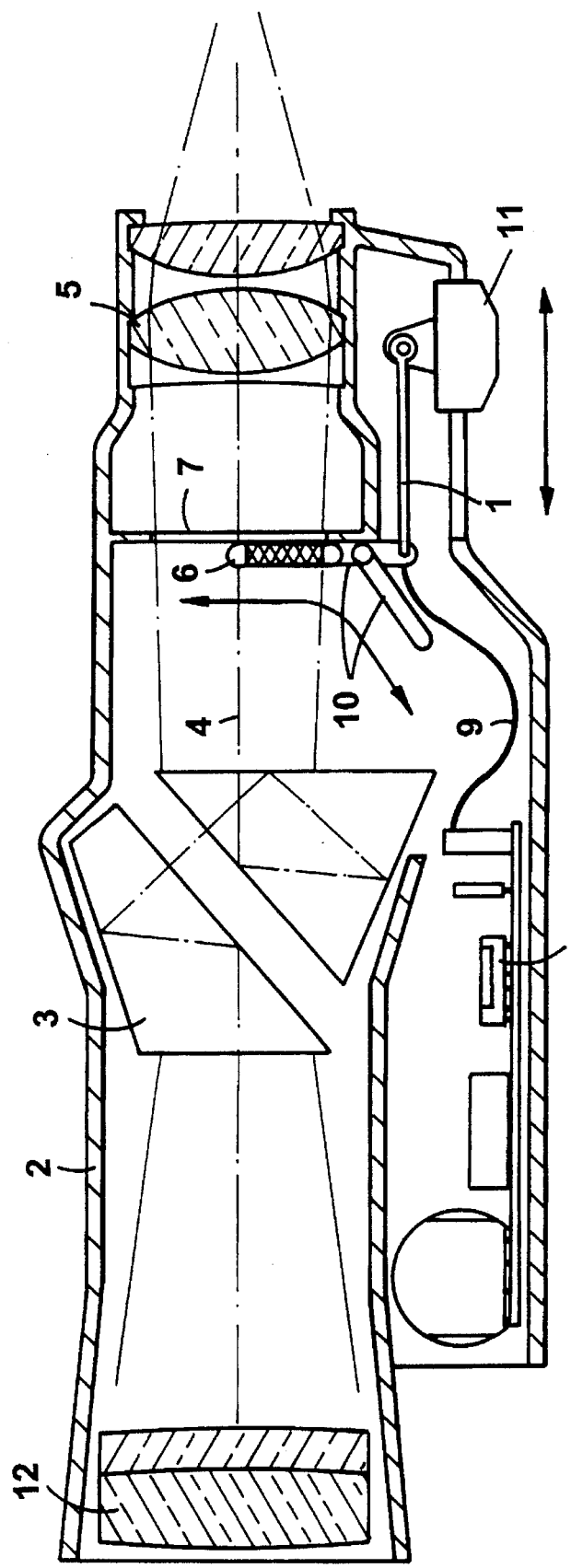

FIG. 2 shows the same assembly as FIG. 1 but with information carrier 6 swiveled in.

Figure 3:
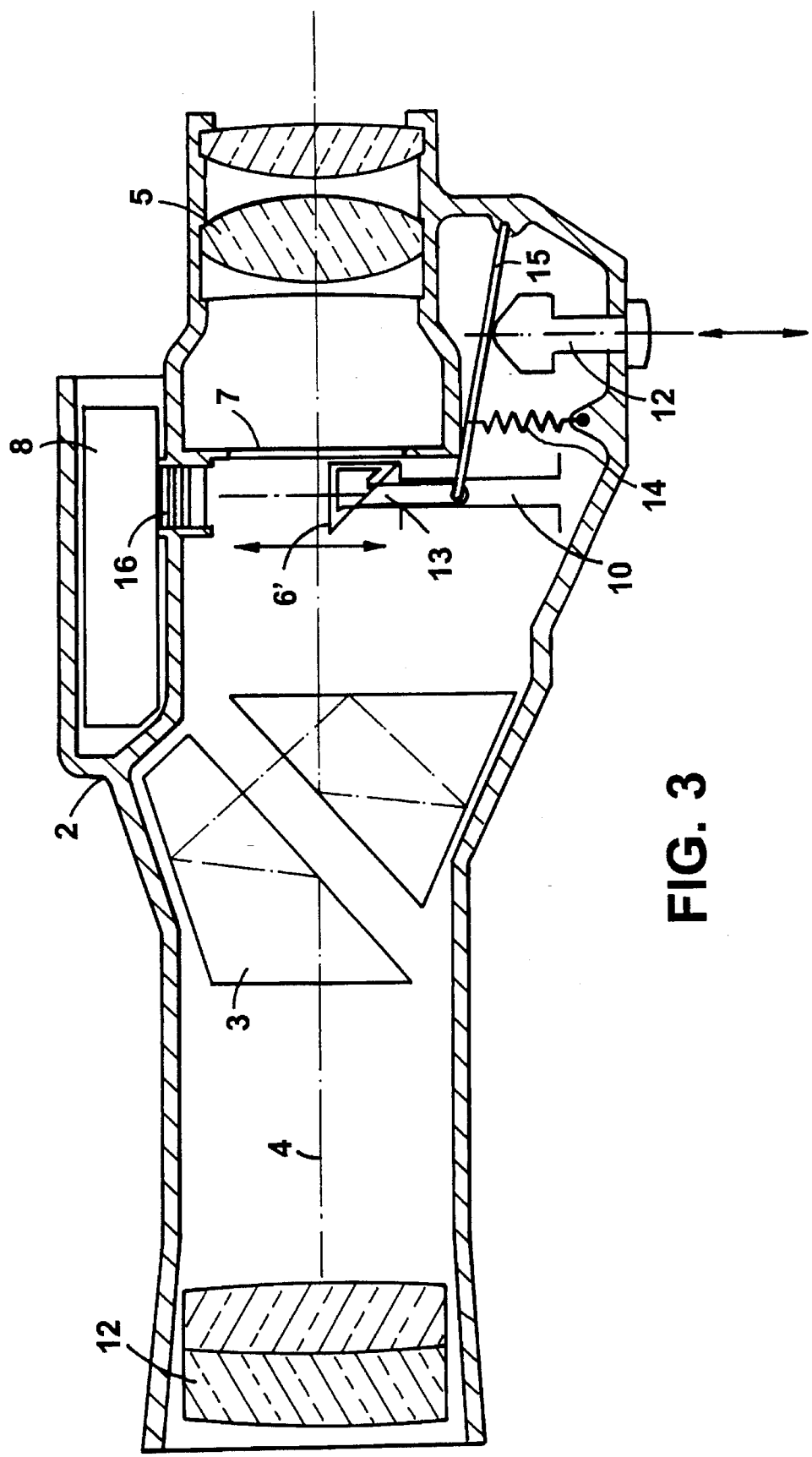

FIG. 3 shows a longitudinal section of one half of the field glass comprising housing 2, prisms 3, diaphragm 7, eyepiece 5 and objective 12.

The additional information obtained in additional information means 8, which can work mechanically or electronically, is projected via additional optical system 16 onto information deflecting means 6', in this case a prism.

Information deflecting means 6' is insertable into beam path 4 between objective 12 and eyepiece 5. Information deflecting means 6' is moved by control push-button 12 which acts on information deflecting means 6' via transmitting swing rod 15 and holding means 13 which is displaceable in guide means 10. Number 14 refers to a tension spring. The figure shows information deflecting means 6' in the inserted state.

We claim:

1. A field glass comprising a housing, an objective and an eyepiece defining a beam path therebetween, through said housing, and means for alternatively observing additional information comprising at least one information carrier or information deflecting means disposed within the housing of the field glass and adapted to be brought into and out of the beam path between the objective and the eyepiece, said beam path being only partially obstructed by said at least one information carrier or information deflecting means disposed in a first position within said housing, and said beam path being fully unobstructed by said at least one information carrier or information deflecting means disposed in a second position within said housing.

2. A field glass comprising:

a housing, an objective and an eyepiece defining a beam path therebetween, through said housing, and, disposed within said housing, means for alternatively observing additional information through said eyepiece, said means for alternatively observing additional information comprising at least one information carrier or information deflecting means, said at least one information carrier or information deflecting means being mounted for selective movement within said housing between a first position within said housing disposed in said beam path and a second position within said housing withdrawn from said beam path, said beam path being only partially obstructed by said at least one information carrier or information deflecting means in said first position, and said beam path being fully unobstructed by said at least one information carrier or information deflecting means said second position.

\* \* \* \* \*